United States Patent [19]

Fedewitz

[11] 4,283,006
[45] Aug. 11, 1981

[54] THERMALLY-ACTIVATED CLOSURE DEVICE

[76] Inventor: James A. Fedewitz, 222 Cornelia St., Boonton, N.J. 07005

[21] Appl. No.: 168,308

[22] Filed: Jul. 10, 1980

[51] Int. Cl.³ .............................................. G05D 23/08
[52] U.S. Cl. ................................ 236/1 G; 236/93 R; 236/101 B; 251/212
[58] Field of Search ................. 236/1 G, 93 R, 101 B, 236/101 E; 251/313, 305, 212; 49/349, 386

[56] References Cited

U.S. PATENT DOCUMENTS

| 1,659,875 | 2/1928 | Jacobs | 236/93 R |
| 1,743,731 | 1/1930 | Scott | 236/1 G X |
| 1,784,608 | 12/1930 | Meyers | 236/93 R |
| 2,062,937 | 12/1936 | Root, Jr. | 236/93 R X |
| 2,217,878 | 10/1940 | Walrath | 49/386 X |
| 3,645,443 | 2/1972 | Willson et al. | 236/34 |
| 4,114,805 | 9/1978 | Humphreys et al. | 236/1 G |
| 4,165,833 | 8/1979 | Nagel | 236/1 G |

Primary Examiner—William E. Tapolcai, Jr.
Attorney, Agent, or Firm—Thomas N. Neiman

[57] ABSTRACT

In an embodiment thereof, the closure device comprises a leaf-type, planar, closure element pivotally coupled to a supporting shaft. The shaft is fixed in traverse of a fluid conduit, and the closure element is rotatable therewithin for opening and closing the conduit to fluid flow. Shape-memory alloy components are engaged with the element, and a bearing surface, to cause the element to move from an opened or closed position to the other thereof, or to some intermediate positioning for metered or damping fluid flow, in response to prescribed temperatures.

18 Claims, 2 Drawing Figures

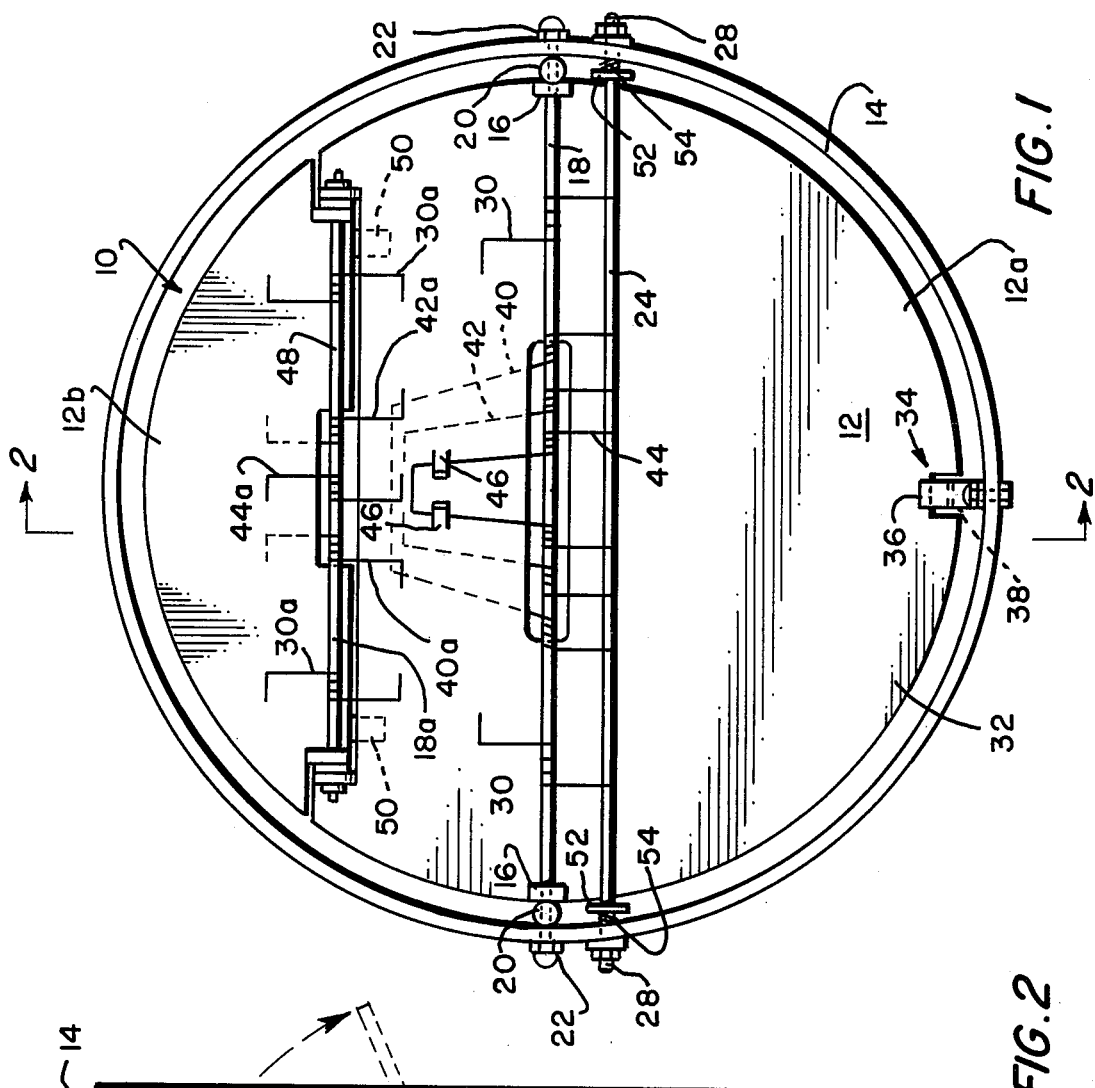
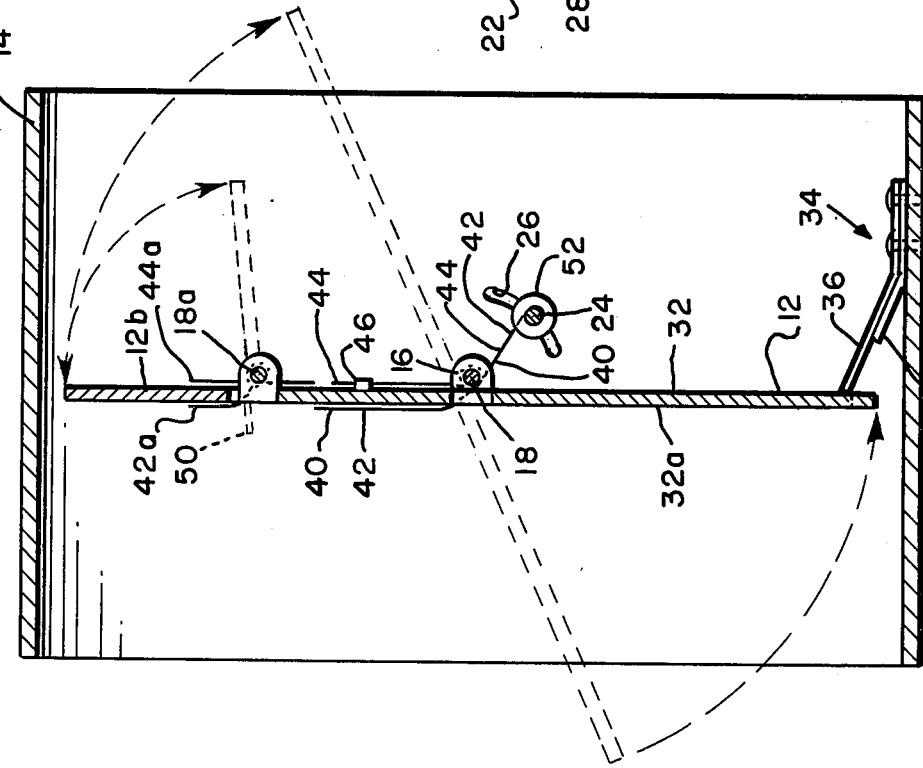

THERMALLY-ACTIVATED CLOSURE DEVICE

This invention pertains to fluid-flow closure devices, and in paticular to a thermally-activated closure device for controlling fluid flow; in a preferred embodiment of the invention, the closure device is actuated by a component comprising a shape-memory alloy.

Shape-memory alloys, and the properties thereof, have been known for over forty years, and of late they have been put to some practical applications. In *Machine Design*, of Oct. 25, 1979, in an article "New Uses For Metals That Remember", by David T. Curry, Staff Editor, and in *Scientific American*, of November, 1979, in an article "Shape-Memory Alloys", by L. McDonald Schetky, the interesting properties of these alloys, and some of the functions to which they have been applied, are rather well disclosed. In view of these publications, it ought not be necessary to reprise what the aforementioned authors, and others, have set forth. However, a brief review of the future of shape-memory alloys, taken from the article by author Curry, might be in order here. "Shape-memory alloys are metals with a mechanical memory. When they are heated they 'remember' a previous shape and snap or bounce back to that shape. Considerable force is exerted as the alloy changes shape; this force can perform useful work . . . " A piece of the alloy, in wire or rod form, is forced into the to-be-remembered shape, and heat-treated to induce memory. After the alloy has cooled down, it may be re-formed to another shape, and it will retain this latter shape unless and until a prescribed transformation temperature is exposed thereto. At this time, the alloy will revert to its memorized shape—exerting force in the transformation, to do mechanical work. Shape-memory alloys can also be "trained" to respond to two transformation temperatures; i.e., such have a two-way memory.

It is already known, as from the *Machine Design* article, to employ a thermally-responsive component, to wit: a shape-memory alloy, to close a water valve at an operative or transformation temperature. In this application, the thermally-responsive component overcomes the valve-opening bias of a spring to translate a plug-type valving element into closure on a valve seat. Such an application does not readily lend itself to other circumstances as, for instance, in flues for heating plants or fireplaces where the valving element or elements must function damper-like, moving from a closed positioning on an axis to an open positioning on the same axis. Yet, due to the excursive temperatures obtaining in flues, and the like, the employment of a thermally-activated device therein is a viable concept. It remained, however, for an inventive conception of practically applying a thermally-responsive component, for instance a shape-memory alloy component, to such use.

It is an object of this invention, then, to set forth a thermally-activated closure device useful in flues and the like which comprises a thermally-responsive, actuating component. Particularly, it is an object of this invention to set forth a thermally-activated closure device comprising a leaf-type, planar, closure element; means coupling said element thereto for rotary movement of said element about an axis; and means engaged with said element for causing rotary movement of the latter from one of two dispositions to the other thereof; wherein said rotary-movement-causing means comprises a thermally-responsive component which, upon exposure thereof to a prescribed temperature, effects rotary movement of said element from one of said two dispositions to the other thereof.

Further objects of this invention, as well as the novel features thereof, will become more apparent by reference to the following description, taken in conjunction with the accompanying figures, in which:

FIG. 1 is a rear, elevational view of an embodiment of the novel closure device, according to the invention, deployed in a flue; and FIG. 2 is a side, elevational view, partially cross-sectioned, of the FIG. 1 embodiment.

As shown in FIGS. 1 and 2, the novel device 10 comprises a leaf-type, planar, closure element 12 which is rotatably journalled in a flue 14. The element 12 has depending limbs 16, at opposite axial ends thereof, which are bored to receive a pivot shaft 18. Ends of the shaft 18 penetrate spherical, spacer-bushings 20, and are held externally of the flue 14 by fasteners 22.

A support bar 24, set in traverse of the flue and parallel to the shaft 18, is slidably engaged, at the ends thereof, with arcuate slots 26 (only one is shown) formed in the wall of the flue 14. Ends of the support bar 24 are threaded, at index number 28, to receive washers and locking nuts 49 disposed against the ends of the support bar 24. The support bar 24 comprises a bearing surface for a pair of biasing springs 30 which have one end thereof constrained against the bar 24, and the other end thereof constrained against the rear surface 32 of the closure element 12. Intermediate portions of the springs 30 are enwrapped about the shaft 18.

The springs 30 cooperate with a limit-stop 34 to urge the closure element 12 to retain the "closed" disposition shown in FIGS. 1 and 2. The limit-stop 34 comprises a thermally-responsive limb 36 which, in this embodiment, comprises a shape-memory alloy having a quiescent conformation, as shown, in which the end thereof presents an obstruction to surface 32. Accordingly, the closure element 12 is prevented from rotating (counterclockwise, as viewed in FIG. 2) by the limit-stop 34, and the springs 30 constrain the closure element against the limit-stop 34.

When limb 36 experiences its thermally-responsive or transformation temperature, it will deflect and move toward the wall of the flue 14. Prior thereto, at substantially the same transformation temperature, the closure element 12 will have commenced clockwise rotation to its "open" position. With attrition of the temperature, a biasing spring 38, located beneath the limb 36, returns the latter, i.e., the pendant end thereof, to the quiescent attitude shown. This occurs before the closure element 12 has returned from its rotary excursion (to the "open" position) to its vertical, "closed" disposition shown—again, to prevent the element from rotating counterclockwise. The pendant end of limb 36 has a small angle through which to move, as compared to the transformation angle through which element 12 must travel. Hence, for substantially some transformation temperatures, for which the Device is designed, limb 36 will be in position to limit-stop the element 12 when it comes vertical.

A plurality of thermally-responsive elements or components 40, 42 and 44, shown in this embodiment to be filamentary in shape, are arranged to cause the closure element 12 to "open" in response to prescribed temperatures obtaining thereat within the flue 14. Component 40 defines a generally U-shaped wire which has the right-angular portions of the "U" bearing against the front surface of the closure element 12 and terminal ends thereof are at least partially enwrapped about the bar 24. Portions of the wire of component 40 are enwrapped about the shaft 18. When wire component 40 experiences a given temperature, it responds and causes the closure element 12 to rotate in a clockwise direction (FIG. 2). In a preferred embodiment of the invention, wire component 42 is formed of the aforesaid shape-memory alloy, so that it awaits it transformation temperature until it responds to take on a more acute-angular shape—wherein the U-shaped portion closes toward the bar 24—to partially "open" the closure element 12.

Wire components 42 and 44 are like component 40, except that each has a different transformation temperature, and each takes on a transformation shape which is more acute than any of the others. Component 40, for instance, will "bend", in transformation, to pivot the closure element through thirty degrees of arc. Component 42 will transform to pivot the closure element through another thirty degrees of arc, and component 44 will transform to pivot the closure element a final thirty degrees of arc. These degrees of "opening", of course, are arbitrary, and may be selected, at will, by defining the device with wire components which respond to transform at chosen elevated temperatures to chosen attitudes of arcuate deformation.

In an alternative embodiment of the invention, wire components 40 and 42 will be thermally-responsive, as aforesaid, to "open" the closure element 12, but wire component 44 will be thermally-responsive to return the fully-opened closure element to its closed attitude. Wire component 44, which is held in place by tabs 46 formed in the element 12, in this latter embodiment, is thermally-responsive in opposition to wire components 40 and 42. Thus, at some temperature $T_1$, component 40 will proceed to "open" the closure element 12, at another temperature $T_2$, component 42 will continue to "open" the element 12, however, at another temperature $T_3$, component 44 will, with the cooperation of springs 30, overcome the components 40 and 42, and close the element, thus regulating fluid flow through a precise temperature interval. This presupposes, of course, that component 44 has sufficient strength, in its thermally-responsive temperature, to counter the restraints of components 40 and 42.

In a further embodiment of the invention, the closure element 12 is formed of a pair of sections 12a and 12b which are hingedly joined together, at 48 (in a manner well known) on a rod 18a. This embodiment accommodates the earlier opening of section 12b. Arrayed between sections 12a and 12b are similar thermally-responsive wire components 40a, 42a and 44a. Ends thereof are constrained against the rear surface 32 and the front surface, with intermediate portions thereof enwrapped about rod 18a. Similarly, as just described in connection with components 40, 42 and 44, wire components 40a, 42a and 44b respond to given temperatures to open section 12b, progressively. Tabs 50, extending from section 12b, engage the rear surface 32a to prevent the section 12b from rotating beyond a co-planar attitude, relative to section 12a, in the counter-clockwise direction.

In yet a further embodiment of the invention, wire components 40a and 42a, alone, operate to "open" section 12b, whereas wire component 44a operates, like the before-described operation of wire component 44, to overcome the force of components 40a and 42a and "close" section 12b. In a preferred embodiment of the sectioned closure element 12, wire component 44a proceeds to respond, thermally, as soon as wire component 40 also becomes thermally responsive. Thus, upon wire components 40a and 42a having opened section 12b, wire component 44a will return section 12b to a co-planar attitude, relative to section 12a, as section 12a proceeds to rotate about the axis of shaft 18.

With the selected displacement of support bar 24 through the slots 26, one end or the other thereof could become free and displace into the flue 14 unless means are provided to keep the bar in optimum positioning. To this purpose, retaining rings 52 are fixed on opposite ends of the bar 24, and compression springs 54 are interposed between the rings 52 and the inner surface of the flue 14. By this means, the bar is held in the slots and proportionately extended therethrough.

While I have described my invention in connection with specific embodiments thereof it is to be clearly understood that this is done only by way of example and not as a limitation to the scope of my invention, as set forth in the objects thereof and in the appended claims.

I claim:

1. A thermally-activated closure device, comprising:
a leaf-type, planar, closure element;
means supporting said element for rotary movement of said element about an axis;
means engaged with said element for causing rotary movement of the latter from one of two dispositions to the other thereof;
means biasing said element in said one disposition; and
thermally-responsive, limit-stop means, fixed to said coupling means, cooperative with said biasing means for restraining said element in said one disposition; wherein
said rotary-movement-causing means comprises a thermally-responsive component which, upon exposure thereof to a prescribed temperature, effects rotary movement of said element from said one disposition to the other thereof.

2. A thermally-activated closure device, comprising:
a leaf-type, planar, closure element;
means supporting said element for rotary movement of said element about an axis; and
means engaged with said element for causing rotary movement of the latter from one of two dispositions to the other thereof; wherein
said rotary-movement-causing means comprises a thermally-responsive component which, upon exposure thereof to a prescribed temperature, effects rotary movement of said element from one of said two dispositions to the other thereof; and
said rotary-movement-causing means comprises a plurality of said thermally-responsive components which, upon exposure of one of said components of said plurality thereof to a prescribed temperature, effects rotary movement of said element from one of said two dispositions to the other thereof, as aforesaid, and, upon exposure of another of said components to a temperature of other than said prescribed temperature, effects rotary movement of said element from one of said two dispositions to a third disposition.

3. A thermally-activated device, according to claim 2, wherein:
said components are formed of a shape-memory alloy.

4. A thermally-activated device, according to claim 2, wherein:
said rotary-movement-causing means further comprises a bearing surface; and said components are reactively engaged with said bearing surface.

5. A thermally-activated device, according to claim 2, wherein:
said plurality comprises a further, thermally-responsive component which, upon exposure thereof to a temperature distinguished from said prescribed and other temperatures, effects rotary movement of said element from one of said first, second, and third dispositions to a fourth disposition.

6. A thermally-activated device, according to claim 5, wherein:
said thermally-responsive components of said plurality thereof comprise means for causing rotary movement of said element in a same direction.

7. A thermally-activated device, according to claim 5, wherein:
said thermally-responsive components of said plurality thereof comprise means for causing rotary movement of said element in a first, given direction, and in a second, opposite direction.

8. A thermally-activated device, according to claim 2, wherein:
said plurality comprises a further, thermally-responsive component which, upon exposure thereof to a temperature distinguished from said prescribed and other temperatures, effects rotary movement of said element from one of said second and third dispositions to said first disposition.

9. A thermally-activated device, according to claim 2, further including:
means engaged with said bearing surface and said closure element for biasingly resisting component-movement of said element.

10. A thermally-activated device, according to claim 9, further including:
means, engaging said resisting means, selectively adjustable for altering the bias with which said resisting means opposes component-movement of said element.

11. A thermally-activated device, according to claim 2, wherein:
said closure element has an aperture formed therein for accommodating fluid flow therethrough; and
at least a portion of said component traverses said aperture.

12. A thermally-activated device, according to claim 2, wherein:
said closure element comprises a plurality of leaf-type, planar sections; and further including
means joining said sections together, for relative rotary movement therebetween; and
means engaged with said sections for causing rotary movement, of at least one of said sections relative to another section of said plurality thereof, from a first of two dispositions to a second thereof; wherein
said engaged means comprises a thermally-responsive component which, upon exposure thereof to a prescribed temperature, effects rotary movement of said one section from one of said first and second dispositions to the alternative thereof.

13. A thermally-activated device, according to claim 2, wherein:
said closure element comprises a plurality of leaf-type, planar sections; and further including
means joining said sections together, for relative rotary movement therebetween; and means engaged with said sections for causing rotary movement, of at least one of said sections relative to another section of said plurality thereof, from a first of a plurality of dispositions to another of said dispositions; wherein
said engaged means comprises a plurality of thermally-responsive components which, upon exposure of one thereof to a prescribed temperature, effects rotary movement of said one section from one of said plurality of dispositions to another thereof, upon exposure of another of said components to a given temperature other than said prescribed temperature, effects rotary movement of said one section from one of said one and another dispositions to a different disposition, and upon exposure of a further one of said components, to a temperature distinguished from said prescribed and given temperatures, effects rotary movement of said one section from one of said another and different dispositions to said one disposition.

14. A thermally-activated device, according to claim 13, wherein:
said further one of said components comprises means thermally-responsive, to effect rotary movement of said one section from one of said another and different dispositions to said one disposition, to a temperature at which one of said components of said plurality thereof causes rotary movement of said closure element about said axis.

15. A thermally-activated device, comprising:
a leaf-type, planar element;
means supporting said element for rotary movement of said element about an axis; and
means engaged with said element for causing rotary movement of the latter from one of two dispositions to the other thereof; wherein
said rotary-movement-causing means comprises a thermally-responsive component which, upon exposure thereof to a prescribed temperature, effects rotary movement of said element from one of said two dispositions to the other thereof;
said closure element comprises a plurality of leaf-type, planar sections; and further including
means joining said sections together, for relative rotary movement therebetween; and
means engaged with said sections for causing rotary movement, of at least one of said sections relative to another section of said plurality thereof, from a first of two dispositions to a second thereof; wherein
said engaged means comprises a thermally-responsive component which, upon exposure thereof to a prescribed temperature, effects rotary movement of said one section from one of said first and second dispositions to the alternative thereof; and
said engaged means comprises a plurality of said thermally-responsive components which, upon exposure of one of said components of said plurality thereof to a prescribed temperature, effects rotary movement of said one section from one of said first and second dispositions to the alternative thereof, as aforesaid, and, upon exposure of a second of said components to a given temperature other than said prescribed temperature, effects rotary movement of said one section from one of said first and second dispositions to another disposition.

16. A thermally-activated device, according to claim 15, wherein:
said engaged means comprises a third, thermally-responsive component which, upon exposure thereof to a predetermined temperature distinguished from said prescribed and given temperatures, effects rotary movement of said one section from one of said first, second and another dispositions to a different disposition.

17. A thermally-activated device, according to claim 16, wherein:
said first, second and third components of said plurality thereof comprise means for causing rotary movement of said one section in a same direction.

18. A thermally-activated device, according to claim 16, wherein:
said first, second and third components of said plurality thereof comprise means for causing rotary movement of said one section in one direction, and in a direction opposite to said one direction.

* * * * *